United States Patent
Deng et al.

(10) Patent No.: US 9,320,082 B2
(45) Date of Patent: Apr. 19, 2016

(54) METHOD AND SYSTEM FOR SWITCHING WIRELESS DEVICES IN LOOPED NETWORK

(75) Inventors: Zhihang Deng, Shenzhen (CN); Jizhou Li, Shenzhen (CN); Xiong Tang, Shenzhen (CN); Diqiang Zhang, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 111 days.

(21) Appl. No.: 14/241,006

(22) PCT Filed: Jan. 17, 2012

(86) PCT No.: PCT/CN2012/070499
§ 371 (c)(1),
(2), (4) Date: Feb. 25, 2014

(87) PCT Pub. No.: WO2012/152086
PCT Pub. Date: Nov. 15, 2012

(65) Prior Publication Data
US 2014/0221045 A1 Aug. 7, 2014

(30) Foreign Application Priority Data
Sep. 2, 2011 (CN) .......................... 2011 1 0258902

(51) Int. Cl.
*H04W 68/00* (2009.01)
*H04W 88/08* (2009.01)
(Continued)

(52) U.S. Cl.
CPC ............... *H04W 88/08* (2013.01); *H04L 1/203* (2013.01); *H04L 45/00* (2013.01); *H04W 24/04* (2013.01); *H04W 88/085* (2013.01)

(58) Field of Classification Search
CPC ... H04L 12/403; H04L 43/0817; H04L 12/42; H04L 12/437; H04L 12/4641; H04L 41/0631; H04L 45/245; H04L 45/28; H04L 12/14; H04L 12/4625; H04L 25/03828; H04L 27/2607; H04L 27/2626; H04L 27/2647; H04L 27/265; H04L 27/2665; H04J 14/0206; H04J 14/0212; H04J 14/0283; H04J 14/0295; H04J 14/0227; H04J 14/0246; H04J 14/025; H04J 14/0284; H04J 14/0286; H04J 14/0294; H04J 14/0297; H04J 2203/0094; H04J 3/0623; H04J 3/0647; H04J 3/0682; H04J 3/01; H04W 24/08; H04W 88/085; H04W 16/04; H04W 24/02
See application file for complete search history.

(56) References Cited

U.S. PATENT DOCUMENTS

| 7,307,947 B2 | 12/2007 | Okuno |
| 2002/0181392 A1 | 12/2002 | Okuno |

(Continued)

FOREIGN PATENT DOCUMENTS

| CN | 101640622 A | * | 2/2010 | ............ H04L 12/403 |
| CN | 101695175 A | * | 4/2010 | .......... H04L 43/0817 |

(Continued)

OTHER PUBLICATIONS

International Search Report in international application No. PCT/CN2012/070499, mailed on Jun. 14, 2012. (3 pages—see entire document).

(Continued)

*Primary Examiner* — Golam Sorowar
(74) *Attorney, Agent, or Firm* — Oppedahl Patent Law Firm LLC (57) ABSTRACT

The disclosure discloses a method and system for switching wireless devices in a looped network. The wireless devices include a core wireless device and remote wireless devices, and the core wireless device and two or more remote wireless devices, connected through two ports of the core wireless device, constitute a looped network; the method including: when the core wireless device detects that a line error rate at each of the two ports is within a determined threshold range, the core wireless device sends a valid control character, otherwise, the core wireless device sends an invalid control character; wherein the valid control character sent at one of the two ports of the core wireless device is different from that sent at another of the two ports of the core wireless device; when the remote wireless device detects that a line error rate at a receiving end of a master port of the remote wireless device is within the determined threshold range, the remote wireless device forwards the valid control character received at a slave port to the master port, otherwise, the remote wireless device sends the invalid control character to the master port; and the remote wireless device sends the invalid control character to its slave port continuously. With the present disclosure, the stability of the networking mode through the RRUs is promoted.

12 Claims, 3 Drawing Sheets

(51) Int. Cl.
*H04L 1/20* (2006.01)
*H04L 12/701* (2013.01)
*H04W 24/04* (2009.01)

(56) References Cited

U.S. PATENT DOCUMENTS

| | | | | |
|---|---|---|---|---|
| 2008/0089235 | A1* | 4/2008 | Kotrla | H04L 41/0659 370/242 |
| 2011/0173489 | A1* | 7/2011 | Song | H04L 12/403 714/4.3 |
| 2012/0163166 | A1* | 6/2012 | Peng | H04L 12/437 370/225 |
| 2012/0204084 | A1* | 8/2012 | Zhang | H04W 24/08 714/807 |

FOREIGN PATENT DOCUMENTS

| | | |
|---|---|---|
| CN | 101753244 A | 6/2010 |
| CN | 102307368 A | 1/2012 |
| CN | 102316484 A | 1/2012 |
| GB | 2378867 B | 11/2004 |
| JP | 2007529926 A | 10/2007 |
| JP | 2008516503 A | 5/2008 |
| JP | 2010166531 A | 7/2010 |
| WO | 2010050631 A1 | 5/2010 |
| WO | 2010105572 A1 | 9/2010 |

OTHER PUBLICATIONS

English Translation of the Written Opinion of the International Search Authority in international application No. PCT/CN2012/070499, mailed on Jun. 14, 2012. (11 pages—see entire document).

* cited by examiner

METHOD AND SYSTEM FOR SWITCHING WIRELESS DEVICES IN LOOPED NETWORK

TECHNICAL FIELD

The present disclosure relates to switching technology of wireless device in a looped network, and in particular to a switching method and system in a looped network consisting of a Remote Radio Unit (RRU) and a Building Baseband Unit (BBU) in a wireless communication network.

BACKGROUND

To achieve a better network coverage, a distributed base station architecture is arranged in some blind areas for network coverage such as a office, an elevator. The distributed base station architecture mainly includes the RRU and the BBU, both of which are connected using an optical fiber. The RRU is further connected to an antenna through a coaxial cable and a power splitter (coupler). One BBU may support multiple RRUs. The BBU is mainly placed in a computer room, while the RRUs may be mounted in a location such as each floor and an elevator based on a requirement on signal coverage. The BBU is mainly used to perform processing of baseband data, data interaction with the RRU, as well as data interaction with a Base Station Controller (BSC). The RRU is mainly used to perform radio frequency processing of link data and data interaction with a mobile terminal.

Existing connections between the RRU and the BBU are in a distributed way. Generally, multiple RRUs are connected onto a certain distributed link. Once there is a connection failure occurred on a certain RRU on a link connected with the BBU, or occurred on a link between the RRUs or between the RRU and the BBU, the failed RRU or the RRU in the failed link will be in a disconnected state, and thus leading to a connection failure of the adjacent RRUs. Therefore, although the existing networking mode is simple, the corresponding network structure is relatively fragile that a network failure occurred on a certain link may result in the connection failure of part of the RRUs.

SUMMARY

According to an aspect of the disclosure, the disclosure provides a method and system for switching wireless devices in a looped network, through which the redundancy switching feature may be taken full advantage of in the looped network structure, robustness of each network element, i.e., BBU and RRU, may be ensured, and network stability may be enhanced.

The disclosure provides a method for switching wireless devices in a looped network, where the wireless devices include a core wireless device and remote wireless devices. The core wireless device and two or more remote wireless devices, connected through two ports of the core wireless device, constitute a looped network; the method includes:

at the core wireless device, detecting whether a line error rate at each of the two ports is within a determined threshold range; if so, the core wireless device sends a valid control character, otherwise, the core wireless device sends an invalid control character, where the valid control character sent at one of the two ports of the core wireless device is different from that sent at another of the two ports of the core wireless device;

at the remote wireless device, detecting whether a line error rate at a receiving end of a master port of the remote wireless device is within the determined threshold range; if so, the remote wireless device forwards the valid control character received at a slave port to the master port, otherwise, the remote wireless device sends the invalid control character to the master port; and each remote wireless device sends the invalid control character to its slave port continuously.

Preferably, the method may further include:

in an unlinked state, when one valid control character is received at one port the remote wireless device and another valid control character is received at another port of the remote wireless device, the remote wireless device sets a port at which a valid control character with a higher priority is received as the slave port, and another port as the master port.

Preferably, the method may further include:

in the unlinked state, when the valid control character is received at one port of the remote wireless device and no valid control character is received at another port, the remote wireless device sets a port at which the valid control character is received as the slave port, and another port as the master port.

Preferably, the method may further include:

when the remote wireless device detects that the line error rate at a receiving end of the slave port of the remote wireless device is not within the determined threshold range, the remote wireless device transitions from a linked state to the unlinked state.

Preferably, the method may further include:

when no valid control character is detected at the slave port of the remote wireless device, the remote wireless device transitions from the linked state to the unlinked state.

Preferably, the remote wireless device in the unlinked state sends the invalid control character at its both ports.

Preferably, the core wireless device may be a Building Baseband Unit (BBU); and the remote wireless device may be a Remote Radio Unit (RRU).

The present disclosure also provides a system for switching wireless devices in a looped network, where the wireless devices include a core wireless device and remote wireless devices, and the core wireless device and two or more remote wireless devices, connected through two ports of the core wireless device, constitute a looped network;

where the core wireless device is configured to, when detecting that a line error rate at each of the two ports is within a determined threshold range, send a valid control character, and otherwise, send an invalid control character, where the valid control character sent at one of the two ports of the core wireless device is different from that sent at another of the two ports of the core wireless device;

the remote wireless device is configured to, when detecting that a line error rate at a receiving end of a master port of the remote wireless device is within the determined threshold range, forward the valid control character received at a slave port to the master port, and otherwise, send the invalid control character; the remote wireless device is further configured to continuously send the invalid control character to its slave port.

Preferably, in an unlinked state, the remote wireless device may be further configured to, when detecting that one valid control character is received at one port of the remote wireless device and another valid control character is received at another port of the remote wireless device, set a port at which a valid control character with a higher priority is received as the slave port, and another port as the master port.

Preferably, in the unlinked state, the remote wireless device may be further configured to, when detecting that the valid control character is received at one port and no valid control character is received at another port, set a port at which the valid control character is received as the slave port, and another port as the master port.

Preferably, the remote wireless device may be further configured to, when detecting that the line error rate at a receiving end of its slave port is not within the determined threshold range, transition from a linked state to the unlinked state.

Preferably, the remote wireless device may be further configured to, when detecting that no valid control character is received at its slave port, transition from the linked state to the unlinked state.

Preferably, the remote wireless device may be further configured to, when determining that it is in the unlinked state, send an invalid character at its both ports.

Preferably, the core wireless device may be a Building Baseband Unit (BBU); and the remote wireless device may be a Remote Radio Unit (RRU).

A Building Baseband Unit (BBU), including: a detecting unit, a first sending unit, a second sending unit and at least two ports;

where, two ports in the at least two ports are configured to serve as interfaces through which a looped network containing Remote Radio Unit (RRU) is connected;

the detecting unit is configured to detect whether a line error rate at each of the two ports of the looped network is within a determined threshold range, if so, the detecting unit triggers the first sending unit, otherwise, the detecting unit triggers the second sending unit;

the first sending unit is configured to send a valid control character to each of the two ports, where the valid control character sent to one of the two ports of the core wireless device is different from that sent to another of the two ports of the core wireless device;

the second sending unit is configured to send an invalid control character to each of the two ports.

A Remote Radio Unit (RRU), including: a detecting unit, a first sending unit, a second sending unit and a third sending unit;

where, the detecting unit is configured to detect whether a line error rate at a receiving end of a master port is within a determined threshold range, if so, the detecting unit triggers the first sending unit, otherwise, the detecting unit triggers the second sending unit;

the first sending unit is configured to send a valid control character received at a slave port to the master port;

the second sending unit is configured to send an invalid control character to the master port; and the third sending unit is configured to continuously send an invalid control character to the slave port.

Preferably, the RRU may further include: a setting unit, where when the RRU is in an unlinked state, the detecting unit may be further configured to, when detecting that one valid control character is received at one port of the RRU and another different valid control character is received at another port of the RRU, trigger the setting unit;

the setting unit may be configured to set a port at which the valid control character with a higher priority is received as the slave port, and another port as the master port.

Preferably, when the RRU is in an unlinked state, the detecting unit may be further configured to, when detecting that the valid control character is received at one port of the RRU and no valid control character is received at another port, trigger the setting unit;

the setting unit may be further configured to set a port at which the valid control character is received as the slave port, and another port as the master port.

Preferably, the RRU may further include: a transitioning unit;

where the detecting unit may be further configured to, when detecting that a line error rate at a receiving end of the slave port of the RRU is not within the determined threshold range, trigger the transitioning unit;

the transitioning unit is configured to transition the RRU from a linked state to the unlinked state.

Preferably, the detecting unit may be further configured to, when detecting that no valid control character is received at the slave port of the RRU, trigger the transitioning unit;

the transitioning unit may be further configured to transition the RRU from the linked state to the unlinked state.

In the present disclosure, multiple RRUs constitute a looped network structure through two ports of a BBU, which are served as a pair of ports for the looped network. When the BBU detects that a line error rate at each of its two ports is within a determined threshold range, a valid control character is sent; otherwise, an invalid control character is sent. The valid control character sent at one of the two ports of the core wireless device is different from that sent at another of the two ports of the core wireless device. When each RRU detects that a line error rate at a receiving end of a master port of the RRU is within the determined threshold range, a valid control character received at a slave port is forwarded to the master port; otherwise, an invalid control character is sent to the master port; and the invalid control character is sent to the slave port continuously by the core wireless device. By this means, when a failure occurs in a link or a certain RRU of the looped network, the link may be switched timely, and thus may ensure that the RRUs located on both sides of the failed link or RRU keep working normally.

DETAILED DESCRIPTION

According to various embodiments of the present disclosure, multiple RRUs constitute a looped network structure through two ports of a BBU, which are served as a pair of ports for the looped network. When the BBU detects that a line error rate at each of its two ports is within a determined threshold range, a valid control character is sent; otherwise, an invalid control character is sent. The valid control character sent at one of the two ports of the core wireless device is different from that sent at another of the two ports of the core wireless device. When each RRU detects that a line error rate at a receiving end of a master port of the RRU is within the determined threshold range, a valid control character received at a slave port is forwarded to the master port; otherwise, an invalid control character is sent to the master port; and the invalid control character is sent to the slave port continuously by the core wireless device.

In the switching method for the looped network proposed by the present disclosure, a control character transmitted on a control channel between the BBU and the RRUs is defined firstly. The control character may be a control character A, a control character B, or a control character F. The control character NB is a valid control character, and the control character F is an invalid control character. The control character A/B/F should be mutually different from each other, and a priority for the control character NB may be set as required. In other words, with the technical solutions of the present disclosure, the control of a state of the RRU in the looped network may be implemented flexibly by means of setting the priority of the control character A/B.

In the present disclosure, the RRU may have the following two operating states:

a Linked state, i.e., a link establishment is performed successfully between the RRU and the BBU; and an Unlinked state, i.e., the link establishment is not performed between the RRU and the BBU.

In a wireless communication system, both the BBU and the RRU may perform line error rate detection. When the line error rate exceeds a certain determined threshold, the link is regarded as abnormal.

In the present disclosure, the so called Linked state refers to as a communication link is established between the RRU and the BBU, while the Unlinked state refers to as a communication link is not established between the RRU and the BBU or the established communication link is unavailable (e.g., the line error rate exceeds a determined threshold range). In the present disclosure, the threshold range of the line error rate may be a specific threshold, i.e., when the line error rate does not exceed the threshold, the current communication link is regarded as normal; otherwise, it is regarded as there is a failure on the current communication link, and thus is unavailable. Of course, the threshold range of the line error rate may also be determined as required, i.e., only the line error rate within the determined threshold range is regarded as to indicate that the current communication link is normal; otherwise, the current communication link is regarded as abnormal, i.e., there is a failure on the link.

Figure 1:
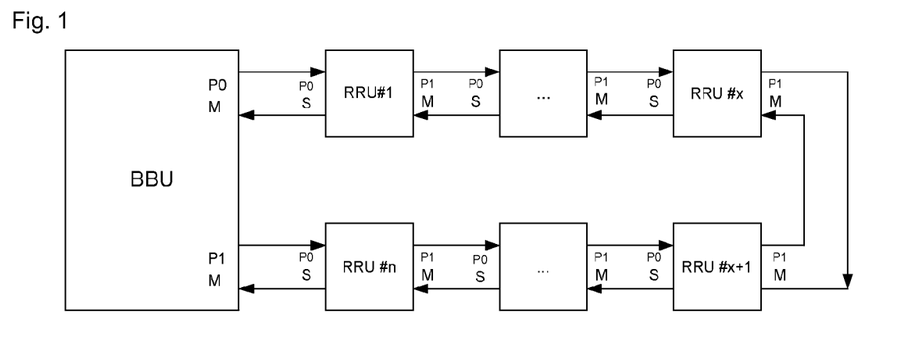
FIG. 1 is a schematic diagram illustrating a topology structure of a looped network consisting of a BBU and a RRU in the present disclosure.

FIG. 1 is a schematic diagram illustrating a topology structure of a looped network consisting of a BBU and RRUs in the present disclosure. As shown in FIG. 1, a networking mode of a looped network consisting of a BBU and RRUs in the present disclosure is described below. Two ports P0/P1 of the BBU are served as a pair of ports for the looped network, both of which are served as master ports in the present disclosure. Two ports P0/P1 of the RRU are served as a master port and a slave port, respectively, when the RRU is in a linked state; and the two are served as default ports P0/P1 (i.e., there is no distinction between the master port and the slave port) when the RRU is in an unlinked state. As shown in the figure, the RRUs are connected successively from RRU#1 to RRU#n. RRU#1 and RRU#n are connected to the port P0 and the port P1 of the BBU respectively. In the present disclosure, the master/slave ports of each RRU need to be determined based on specific conditions.

Figure 2:
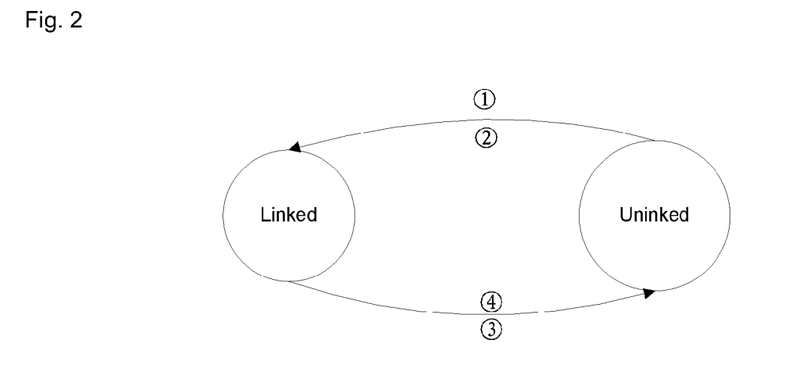
FIG. 2 is a schematic diagram illustrating a transition of an operating state of a RRU in an embodiment of the present disclosure.

FIG. 2 is a schematic diagram illustrating a transition of an operating state of a RRU in an embodiment of the present disclosure. As shown in FIG. 2, the RRU has two transition states: a transition from an Unlinked state to a Linked state, and a transition from a Linked state to an Unlinked state. ①, ②, ③, ④ in FIG. 2 denote four transition conditions, which will be introduced below.

In the switching method for the looped network proposed in the present disclosure, a control character sending rule for the BBU is different from that for the RRU.

The control character sending rule for the BBU is that: when it is detected that a line error rate is within a certain determined threshold range at a master port, a valid control character NB is sent to a sending end of the port, otherwise, an invalid control character F is sent. The valid control character sent at one of the two ports of the BBU is different from that sent at another of the two ports of BBU, i.e., if the control character A is sent at the port P0, the control character B is sent at the port P1.

The control character sending rule for the RRU in Linked operating state is different from that for the RRU in Unlinked operating state.

The control character sending rule for the RRU in the Linked state is that: if it is detected that a line error rate is within a certain determined threshold range at a receiving end of a master port, a valid control character NB received at a slave port is forwarded to the master port, otherwise, an invalid control character F is sent to the master port; and the invalid control character F is sent to the slave port continuously by the RRU.

The control character sending rule for the RRU in the Unlinked state is that: the invalid control character F is sent to each of the two ports P0/P1 by the RRU.

In the switching method for the looped network proposed in the present disclosure, a triggering condition that the RRU transitions from the Unlinked state to the Linked state is that:

① if the control character A and the control character B are simultaneously received at the ports P0/P1, respectively, the RRU is preferred switched to a port at which a valid control character with a higher priority is received, and which is set as the slave port, and another port is set as the master port. The RRU transitions from the Unlinked state to the Linked state;

② if the control character A or the control character B is received at one of the ports P0/P1, and is not received at another port, the RRU is switched to a port at which the control character A or B is received, and which is set as the slave port, and another port is set as the master port. The RRU transitions from the Unlinked state to the Linked state.

A triggering condition that the RRU transitions from the Linked state to the Unlinked state is that:

③ if it is detected that a line error rate is not within the determined threshold range at a receiving end of the current slave port, the RRU transitions from the Linked state to the Unlinked state;

④ if the control character A or B that are used for determining the slave port cannot be detected at the current slave port, the RRU transitions from the Linked state to the Unlinked state;

According to the above transition modes, each RRU in the looped network may be switched based on the control characters received at respective two ports and the state of the RRU, and thus a switching function of the looped network containing multi-stage RRUs is implemented.

The steps for performing a link establishment between the BBU and the RRUs in the looped network are elaborated below by reference to specific examples (it is assumed that the link and each RRU are under normal operations).

Figure 3:
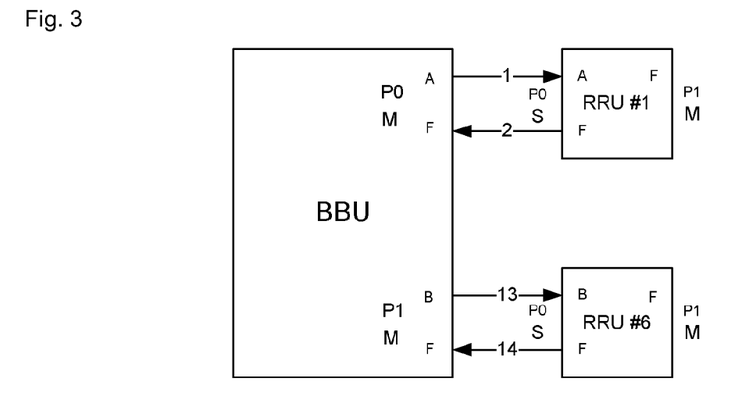
FIG. 3 is a schematic diagram illustrating a topology structure for a link establishment between a BBU and two RRUs in an embodiment of the present disclosure.

FIG. 3 is a schematic diagram illustrating a topology structure for a link establishment between a BBU and two RRUs in an embodiment of the present disclosure. As shown in FIG. 3, the BBU is merely connected to two RRUs (RRU#1, RRU#6). Specifically, RRU#1 is connected to a port P0 of the BBU via link 1, and RRU#6 is connected to a port P1 of the BBU via link 2. Each port P1 of both RRU#1 and RRU#6 is not connected to other network device (RRU). A default initial state of each RRU is a Unlinked state. It is assumed that the BBU sends a valid control character A (0x36) to the port P0, and sends a valid control character B (0xC9) and an invalid control character F (0xFF) to the port P1.

A line error rate (a threshold of the line error rate is assumed as 10E-5) for each of the link 2 and the link 14 is detected at the receiving end of the port P0 for the BBU. Since the links are detected as normal, the line error rate is within the threshold (does not exceed the threshold), and the BBU sends the control character A to the port P0 and sends the control character B to the port P1.

The control character A is received successfully by RRU#1 via the link 1, and no other valid control character (the control character B) is received at a port P1 of RRU#1, then the port P0 is set as a slave port, the port P1 is set as a master port, so the RRU#1 transitions from the Unlinked state to the Linked state. RRU#1 sends the control character F to the slave port; since the master port is not connected to other device, it is detected that the line error rate at the receiving end of the master port exceeds the determined threshold, therefore RRU#1 will send the invalid control character F to the port P1. The state variation of RRU#6 is the same as that of RRU#1.

Figure 4:
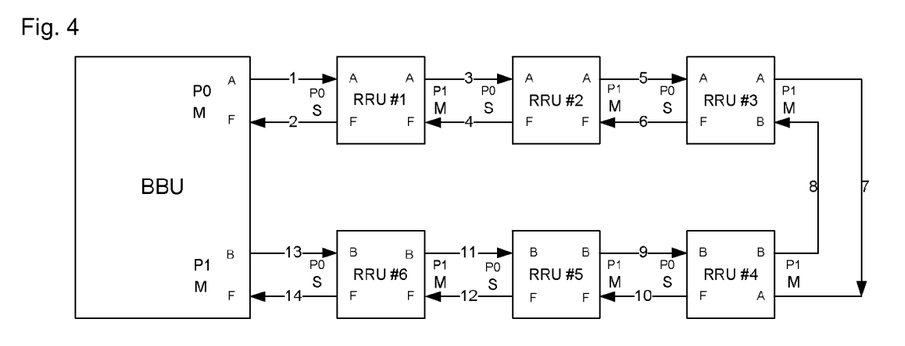
FIG. 4 is a schematic diagram illustrating a topology structure of a looped network consisting of a BBU and six RRUs in an embodiment of the present disclosure.

FIG. 4 is a schematic diagram illustrating a topology structure of a looped network consisting of a BBU and six RRUs in an embodiment of the present disclosure. As shown in FIG. 4, one BBU is connected with six RRUs, in which RRU#2, RRU#5 are first connected based on the topology structure of FIG. 3. The state variation of each of RRU#2, RRU#5 is the same as that of RRU#1 and RRU#6, and thus will not be repeated.

A RRU#3 and a RRU#4 are further connected based on the topology structure with the RRU#2 and the RRU#5. The state variation of each of the RRU#3 and the RRU#4 is the same as that of the RRU#1 and the RRU#6, and thus will not be repeated.

Since each of the RRU#3 and the RRU#4 has been in a Linked state before a link 7 and a link 8 are connected, each of the RRU#3 and the RRU#4 will receive two valid control characters NB when the link 7 and the link 8 are connected based on the state transition principle of the RRU. The RRU#3 will be in a Linked_A state (RRU#3 is in a linked state, and is switched into a direction in which the valid control character A is received), while the RRU#4 will be in a Linked_B state (RRU#4 is in a linked state, and is switched into a direction in which the valid control character B is received). By this means, the link establishment of the BBU and the six RRUs in the looped network is completed based on the switching method.

The switching process of each RRU is introduced when a certain link is disconnected, based on the topology structure of the BBU and the six RRUs in the looped network. In the embodiment, for example, the link 1 is disconnected.

Figure 5:
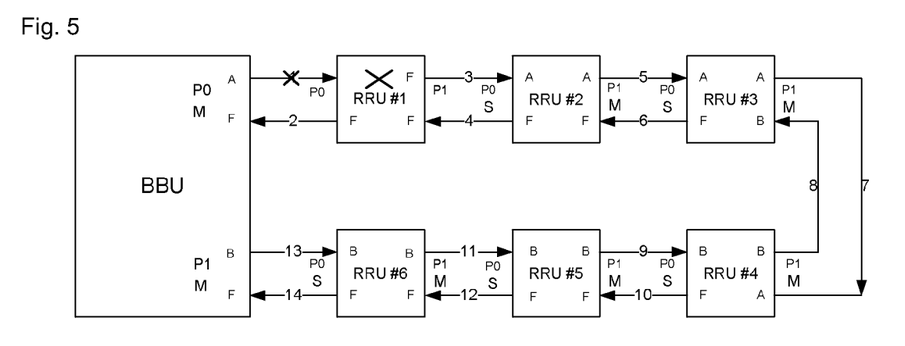
FIG. 5 is a schematic diagram illustrating a topology structure of a looped network after a state variation of a RRU#1 when a link 1 is disconnected in an embodiment of the present disclosure.

FIG. 5 is a schematic diagram illustrating a topology structure after the state variation of the RRU#1 when the link 1 is disconnected in an embodiment of the present disclosure. As shown in FIG. 5, the link 1 is assumed to be disconnected. The RRU#1 may detect that the line error rate at the port P0 exceeds the determined threshold and the control character A is not received at the port P0. Based on the state transition condition in the links mentioned above, the RRU#1 transitions from a Linked state to an Unlinked state at this moment, and sends the control character F to the port P1. The RRU in the block of FIG. 5, which is marked with a cross, denotes that the RRU is in the Unlinked state.

Figure 6:
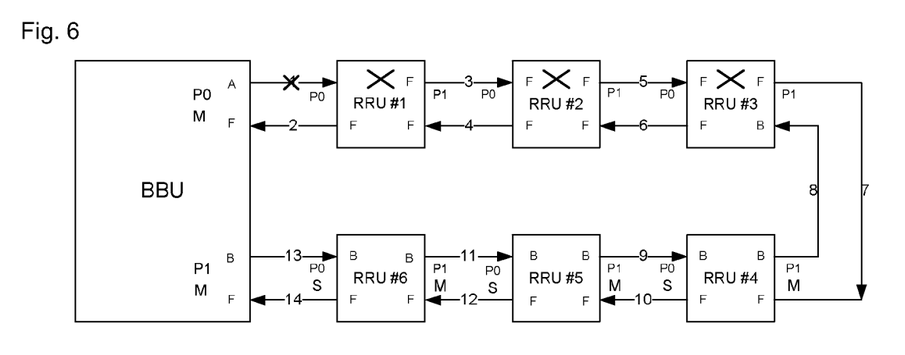
FIG. 6 is a schematic diagram illustrating a topology structure of a looped network after a state variation of a RRU#1/RRU#2/RRU#3 when a link 1 is disconnected in an embodiment of the present disclosure.

FIG. 6 is a schematic diagram illustrating a topology structure after the state variation of the RRU#1/RRU#2/RRU#3 when the link 1 is disconnected in an embodiment of the present disclosure. As shown in FIG. 6, when the RRU#2 detects that a valid control character received at its port P0 becomes an invalid control character F, the RRU#2 transitions from a Linked state to an Unlinked state at this moment based on the state transition principle, and sends the control character F to the port P1. Similarly, the state variation of the RRU#3 is the same as that of the RRU#2.

After the link 1 is disconnected, each of the RRU#1, RRU#2, and RRU#3 transitions from the Linked state to the Unlinked state.

Figure 7:
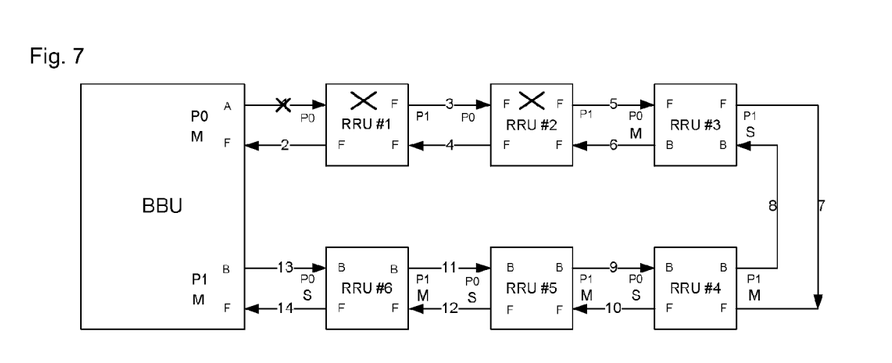
FIG. 7 is a schematic diagram illustrating a topology structure of a looped network after a RRU#3 transitions from an Unlinked state to a Linked state in an embodiment of the present disclosure.

FIG. 7 is a schematic diagram illustrating a topology structure of a looped network after a RRU#3 transitions from an Unlinked state to a Linked state in an embodiment of the present disclosure. As shown in FIG. 7, when the RRU#3 transitions to an Unlinked state, the RRU#3 receives a valid control character B from a link 8 at a receiving end of its port P1, and receives an invalid control character F at it port P0, therefore the RRU#3 may set the port P1 as a slave port, and the port P0 as a master port, then the RRU#3 transitions from the Unlinked state to the Linked state, and sends the control character B to the slave port.

Figure 8:
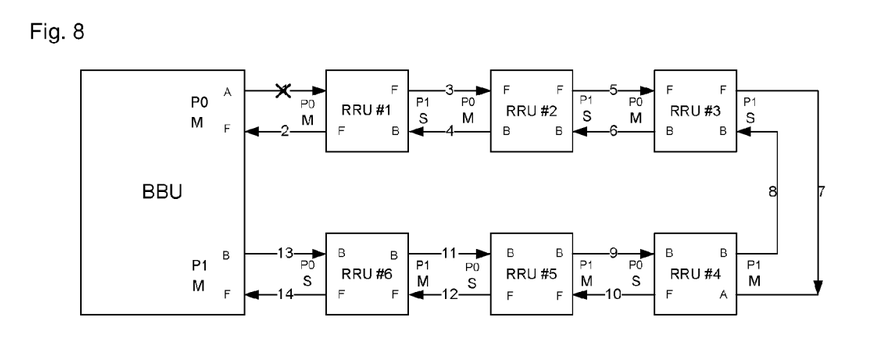
FIG. 8 is a schematic diagram illustrating a topology structure of a looped network after each RRU is switched in an embodiment of the present disclosure.

FIG. 8 is a schematic diagram illustrating a topology structure of a looped network after each RRU is switched in an embodiment of the present disclosure. As shown in FIG. 8, when the RRU#2 detects that the control character received at its port P1 becomes a valid control character B, the RRU#2 transitions from an Unlinked state to a Linked state at this moment based on the state transition principle, therefore the RRU#2 may set the port P1 as a slave port, and the port P0 as a master port, and send the control character B to the port P0.

When the RRU#1 detects that the control character received at its port P1 becomes a valid control character B, the RRU#1 transitions from an Unlinked state to a Linked state at this moment based on the state transition principle, therefore the RRU#1 may set the port P1 as a slave port, and the port P0 as a master port. Since the RRU#1 detects that the line error rate at the master port exceeds the determined threshold, the RRU#1 still sends an invalid control character F to the master port based on the control character sending rule.

The present disclosure also discloses a system for switching wireless devices in a looped network. The wireless devices include a core wireless device and two or more remote wireless devices, and the core wireless device and the two or more remote wireless devices, connected through two ports of the core wireless device, constitute a looped network.

The core wireless device is configured to, when detecting that a line error rate at each of the two ports is within a determined threshold range, send a valid control character, and otherwise, send an invalid control character, where the valid control character sent at one of the two ports of the core wireless device is different from that sent at another of the two ports of the core wireless device;

the remote wireless device is configured to, when detecting that a line error rate at a receiving end of a master port of the remote wireless device is within the determined threshold range, forward a valid control character received at a slave port to the master port, and otherwise, send an invalid control character; the remote wireless device is further configured to continuously send the invalid control character to the slave port.

In an Unlinked state, the remote wireless device is further configured to, when detecting that one valid control character is received at one port of the remote wireless device and another valid control character is received at another port of the remote wireless device, set a port at which a valid control character with a higher priority is received as the slave port, and another port as the master port.

In the Unlinked state, the remote wireless device is further configured to, when detecting that the valid control character is received at one port and no valid control character is received at another port, set a port at which the valid control character is received as the slave port, and another port as the master port.

The remote wireless device is further configured to, when detecting that the line error rate at a receiving end of its slave port is not within the determined threshold range, transition from a Linked state to the Unlinked state.

The remote wireless device is further configured to, when detecting that no valid control character is received at its slave port, transition from the linked state to the unlinked state.

The remote wireless device is further configured to, when determining that it is in the unlinked state, send an invalid character at each of its two ports.

In the system for switching wireless device in a looped network, the core wireless device is a BBU; and the remote wireless device is a RRU. Of course, the system for switching wireless device in a looped network is merely illustrated by taking the looped network structure consisting of the BBU and the RRUs as an example, but is not limited to this looped network structure, for example, it may also be applied in a network formed by a RNC and a base station, or in a network formed by a base station and a relay station.

The system for switching wireless device in a looped network of the present disclosure may be understood by reference to the structures in FIG. 1 to FIG. 8.

A Building Baseband Unit (BBU) of the present disclosure includes: a detecting unit, a first sending unit, a second sending unit and at least two ports;

where two ports in the at least two ports are configured to serve as interfaces through which a looped network containing RRUs is connected;

the detecting unit is configured to detect whether a line error rate at each of the two ports of the looped network is within a determined threshold range, if so, the detecting unit triggers the first sending unit, otherwise, the detecting unit triggers the second sending unit;

the first sending unit is configured to send a valid control character to each of the two ports through which the looped network is connected, where the valid control character sent to one of the two ports is different from that sent to another of the two ports;

the second sending unit is configured to send an invalid control character to each of the two ports through which the looped network is connected.

It should be understood by those skilled in the related art that, the function of each unit in the BBU of the present disclosure may be understood by reference to the description of the method and system for switching wireless devices in a looped network mentioned above. The function of each unit in the BBU of the present disclosure may be implemented through a program to be operated on a processor or a specific logical circuit.

A Remote Radio Unit (RRU) of the present disclosure includes: a detecting unit, a first sending unit, a second sending unit and a third sending unit;

where the detecting unit is configured to detect whether a line error rate at a receiving end of a master port is within a determined threshold range, if so, the detecting unit triggers the first sending unit, otherwise, the detecting unit triggers the second sending unit;

the first sending unit is configured to send a valid control character received at a slave port to the master port;

the second sending unit is configured to send an invalid control character to the master port; and the third sending unit is configured to continuously send an invalid control character to the slave port.

The RRU may further include a setting unit, when the RRU is in an unlinked state, the detecting unit is further configured to, when detecting that one valid control character is received at one port of the RRU and another valid control character is received at another port of the RRU, trigger the setting unit;

the setting unit is configured to set a port at which the valid control character with a higher priority is received as the slave port, and another port as the master port.

When the RRU is in an unlinked state, the detecting unit is further configured to, when detecting that the valid control character is received at one port of the RRU and no valid control character is received at another port, trigger the setting unit;

the setting unit is further configured to set a port at which the valid control character is received as the slave port, and another port as the master port.

The RRU of the present disclosure may further include a transitioning unit;

where the detecting unit is further configured to, when detecting that a line error rate at a receiving end of the slave port of the RRU is not within the determined threshold range, trigger the transitioning unit;

the transitioning unit is configured to transition the state of the RRU from linked to unlinked.

Alternatively, the detecting unit is further configured to, when detecting that no valid control character is received at the slave port of the RRU, trigger the transitioning unit;

the transitioning unit is further configured to transition the state of the RRU from linked to unlinked.

It should be understood by those skilled in the related art that, the function of each unit in the RRU of the present disclosure may be understood by reference to the description of the method and system for switching wireless devices in a looped network mentioned above. The function of each unit in the RRU of the present disclosure may be implemented through a program to be operated on a processor or a specific logical circuit.

What described above are merely preferred embodiments of the present disclosure, but are not intended to limit the protection scope of the present disclosure.

INDUSTRIAL APPLICABILITY

With the present disclosure, when a failure occurs in a link or a certain RRU of the looped network, the link may be switched timely, and thus may ensure that the RRUs located on both sides of the failed link or RRU keep working normally.

The invention claimed is:

1. A method for switching wireless devices in a looped network, wherein the wireless devices comprise a core wireless device and remote wireless devices, and the core wireless device has a first port and a second port, the remote wireless devices comprises at least a first remote wireless device and a second remote wireless device, the core wireless device is connected with the first remote wireless device and the second remote wireless device through the first port and the second port, respectively, the method comprising:
- at the core wireless device, detecting whether a line error rate at each of the first port and the second port is within a determined threshold range; when the detected line error rate is within the determined threshold range, sending a first valid control character to a slave port of the first remote wireless device through the first port of the core wireless device, and sending a second valid control character to a slave port of the second remote wireless device through the second port of the core wireless device, when the detected line error rate is not within the determined threshold range, sending an invalid control character to each of the slave port of the first and second remote wireless devices through respective ports of the core wireless device, wherein the first valid control character is different from the second valid control character;
- at each remote wireless device, detecting whether a line error rate at a receiving end of a master port of the remote wireless device is within the determined threshold range; when the detected line error rate is within the determined threshold range, forwarding the first or second valid control character received at the slave port to the master port, when the detected line error rate is not within the determined threshold range, sending the invalid control character to the master port; wherein each remote wireless device sends the invalid control character to its slave port continuously;
- in an unlinked state, when the first valid control character is received at a first port of the remote wireless device and the second valid control character, which has a priority lower than that of the first valid control character, is received at a second port of the remote wireless device, setting, by the remote wireless device, the first port of the remote wireless device as the slave port, and the second port of the remote wireless device as the master port.

2. The method according to claim 1, further comprising:
in the unlinked state, when the valid control character is received at the first port of the remote wireless device and no valid control character is received at the second port, setting, by the remote wireless device, the first port of the remote wireless device as the slave port, and the second port of the remote wireless device as the master port.

3. The method according to claim 2, further comprising:
when the remote wireless device detects that the line error rate at a receiving end of the slave port of the remote wireless device is not within the determined threshold range or no valid control character is detected at the slave port of the remote wireless device, transitioning, by the remote wireless device, from the linked state to the unlinked state.

4. The method according to claim 3, wherein the remote wireless device in the unlinked state sends an invalid control character at its both ports.

5. The method according to claim 1, wherein the remote wireless device further comprises one or more third remote wireless devices, the third remote wireless devices are connected with each other and connected in series with the first remote wireless device and the second remote wireless device.

6. The method according to claim 1, wherein the core wireless device is a Building Baseband Unit (BBU), and the remote wireless device is a Remote Radio Unit (RRU).

7. A system for switching wireless devices in a looped network, wherein the wireless devices comprise a core wireless device and remote wireless devices, and the core wireless device has a first port and a second port, the remote wireless devices comprises at least a first remote wireless device and a second remote wireless device, the core wireless device is connected with the first remote wireless device and the second remote wireless device through the first port and the second port, respectively, wherein,
- the core wireless device is configured to, when detecting that a line error rate at each of the first port and the second port is within a determined threshold range, send a first valid control character to a slave port of the first remote wireless device through the first port of the core wireless device, and send a second valid control character to a slave port of the second remote wireless device through the second port of the core wireless device, and when detecting that the line error rate at each of the first port and the second port is not within the determined threshold range, send an invalid control character to each of the slave port of the first and second remote wireless devices through respective ports of the core wireless device, wherein the first valid control character is different from the second valid control character; and
- the remote wireless device is configured to, when detecting that a line error rate at a receiving end of a master port of the remote wireless device is within the determined threshold range, forward the first or second valid control character received at the slave port to the master port, and when detecting that the line error rate at a receiving end of a master port of the remote wireless device is not within the determined threshold range, send the invalid control character to the master port; each of the remote wireless devices is further configured to continuously send the invalid control character to its slave port,
- wherein in an unlinked state, the remote wireless device is further configured to, when detecting the first valid control character is received at a first port the remote wireless device and the second valid control character, which has a priority lower than that of the first valid control character, is received at another port of the remote wireless device, set the first port of the remote wireless device as the slave port, and the second port of the remote wireless device as the master port.

8. The system according to claim 7, wherein
in the unlinked state, the remote wireless device is further configured to, when detecting that the valid control character is received at the first port and no valid control character is received at the second port, set the first port of the remote wireless device as the slave port, and the second port of the remote wireless device as the master port.

9. The system according to claim 8, wherein,
the remote wireless device is further configured to, when detecting that the line error rate at a receiving end of its slave port is not within the determined threshold range or no valid control character is received at its slave port, transition from the linked state to the unlinked state.

10. The system according to claim 9, wherein the remote wireless device is further configured to, when determining that it is in the unlinked state, send an invalid character at its both ports.

11. The system according to claim 7, wherein the remote wireless device further comprises one or more third remote wireless devices, the third remote wireless devices are connected with each other and connected in series with the first remote wireless device and the second remote wireless device.

12. The system according to claim 7, wherein the core wireless device is a Building Baseband Unit (BBU); and the remote wireless device is a Remote Radio Unit (RRU).

* * * * *